Nov. 18, 1969     S. A. BRION     3,479,539
ROTARY STEPPING MOTOR WITH PERMANENT MAGNET ROTOR
HAVING ASYMMETRICAL POLES

Filed Oct. 27, 1967     2 Sheets-Sheet 1

FIG. I.

United States Patent Office 3,479,539
Patented Nov. 18, 1969

3,479,539
ROTARY STEPPING MOTOR WITH PERMANENT MAGNET ROTOR HAVING ASYMMETRICAL POLES
Stanley A. Brion, Ilford, England, assignor to The Plessey Company Limited, Ilford, England, a British company
Filed Oct. 27, 1967, Ser. No. 678,605
Claims priority, application Great Britain, Oct. 31, 1966, 48,794/66
Int. Cl. H02k 37/00
U.S. Cl. 310—49          10 Claims

ABSTRACT OF THE DISCLOSURE

A stepping motor comprising a rotor which presents around its periphery an even number of interdigitated alternate north and south magnetic poles which are asymmetrical about the radii of the rotor through their centres, a stator coarial with the rotor having interdigitated stator poles which are in shape preferably symmetrical about the radii through their centres excited in operation by winding coaxial with the rotor and arranged in such manner that in the absence of current the poles of the rotor are regularly offset with respect to at least half of the stator poles and that when the stator poles are energised either by means of alternating current or unidirectional pulses of current a torque is exerted on the rotor.

---

This invention relates to rotary electric machines. According to the invention a rotary electric machine comprises a radially magnetized permanent magnet rotor which presents around its periphery an even number of interdigitated alternate north and south magnetic poles which are asymmetrical with respect to the radii of the rotor through their centres, a stator coaxial with the rotor having interdigitated stator poles which are in shape preferably symmetrical about the radii through their centres, excited in operation by a winding coaxial with the rotor and arranged in such manner that in the absence of current the poles of the rotor are angularly offset with respect to at least half of the stator poles and that when the stator poles are energised either by means of alternating current or unidirectional pulses of current a torque is exerted on the rotor. The rotor may be fabricated from a substantially non-demagnetisable material which may be a ferrite composition and have magnetised around its periphery the said north and south magnetic poles. The asymmetry of the rotor poles ensures that the machine will start, when operated as a step by step motor, in a preferred direction.

The stator may comprise an annular bobbin or former which carries the winding and within which the stator poles are housed. The stator poles may be arranged around the inner surface of the annular bobbin to extend parallel with the longitudinal axis of the bobbin, the rotor being mounted for rotation within a substantially cylindrical space defined by the inner surface of the bobbin and the stator poles. A rotor shaft or spindle to which the rotor is secured may be mounted in bearings housed in magnetic end plates which fit one in each end of the annular bobbin thereby to specifically locate the rotor for rotation within the stator. An annular magnetic yoke may be provided which fits snugly over the bobbin to complete the magnetic circuit of the machine through the end plates. The machine may be enclosed within a non-magnetic housing which may consist of two parts at least one part being adapted to permit the extension of the shaft therethrough when the machine is enclosed within the housing.

The winding may comprise a single coil or it may alternatively comprise two coils which in use are energised to produce opposing fields. Another alternative consists in providing an annular permanent magnet coaxial with the stator and a winding associated with the permanent magnet which when energised produces a magnetic field which cancels and overrides the field of the permanent magnet to produce a field of opposite polarisation to the field magnet. The stator poles may be defined by a magnetic sheet metal open ended cylinder, press pierced to define around its periphery an even number of substantially rectangular pole pieces, evenly spaced and extending parallel to the longitudinal axis of the cylinder. Alternatively the stator poles may be formed in two half members each half member comprising a magnetic castellated substantially annular sheet metal crown, the two half members being assembled within the annular bobbin so that castellations in one half will interlace with similar castellations in the other half thereby to provide interdigitated pole pieces. With this kind of construction the end plates may be made integral with the respective half members.

A machine according to the invention may be operated as a step by step motor when the winding is pulsed with discrete pulses or it may be operated as a synchronous machine when the winding is supplied with alternating current. Alternatively the machine may be operated as a pulse generator, one of two windings being energised with D.C. and the other output winding providing output pulses in response to rotation of the rotor.

An exemplary embodiment of the invention will now be described with reference to the accompanying drawings, in which.

Individual parts of the drawings which are common to the several figures bear the same numerical designations.

Figure 1:
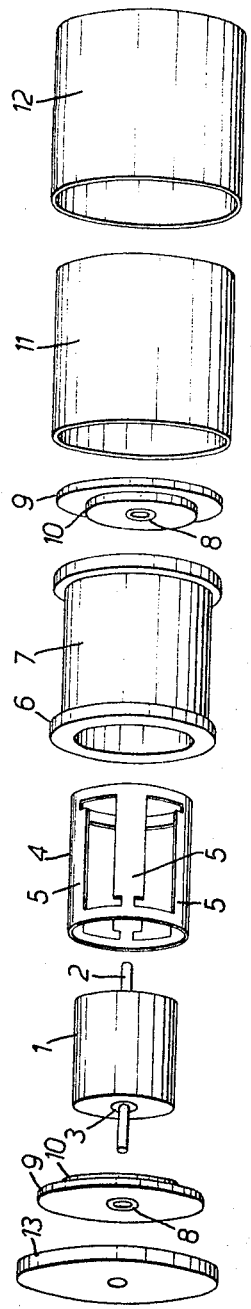
FIGURE 1 is an exploded perspective view of a motor according to the invention.
Figure 2:
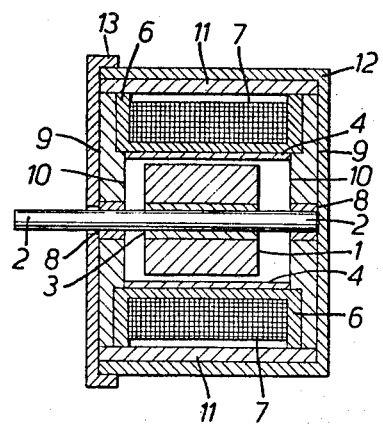
FIGURE 2 is a sectional view taken along the longitudinal axis of the motor of FIGURE 1.

Referring now to FIGURE 1 and FIGURE 2 the motor shown comprises a rotor 1 consisting of an annulus of ferrite material which is capable of being permanently magnetised, a suitable material being for example a ferrite composition manufactured and sold under the registered trademark "Caslox." The rotor 1 is secured to a spindle 2 by means of an epoxy resin or moulded plastics hub 3.

The stator of the motor comprises an open-ended magnetic sheet metal cylinder 4 press pierced to define an even number of substantially rectangular pole pieces 5 evenly spaced around the cylinder so as to extend parallel with its longitudinal axis, and an annular bobbin 6 on which is wound a field winding 7 and within which the cylinder 4 is a push fit. The rotor 1 is mounted for rotation in bronze bearings 8 of two similar magnetic end plates 9, the end plates 9 each having formed thereon a shoulder 10 which extends into the bobbin 6 with a push fit. To complete the motor magnetic circuit, an open-ended magnetic sheet metal cylinder 11 is provided which surrounds the bobbin 6 to complete the magnetic circuit through end plates 9. The assembled rotor 1 and stator are contained within a plastics housing comprising a housing body 12 open at one end, and an end cap 13 which fits tightly over the open end of the housing body 12 to seal the motor therein and through which the spindle 2 extends.

Figure 3:
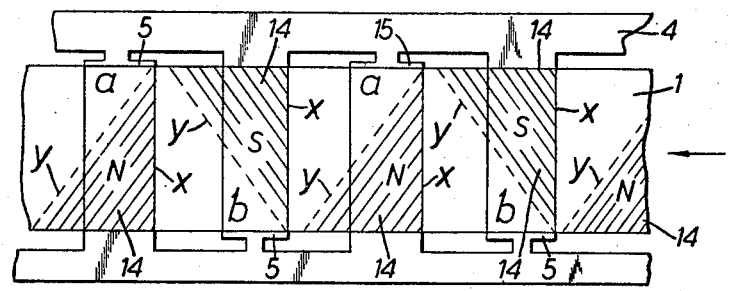
FIGURE 3 is a development of part of the rotor and part of the stator shown in FIGURES 1, 2.

The rotor 1 is permanently magnetised in the radial direction to form in its outer periphery and along its longitudinal axis an even number of interdigitated alternate north/south poles which correspond with the pole pieces 5 but which are arranged to be asymmetrical about the rotor radii through their centres. The shape of the magnetised rotor poles and the operation of the motor will now be described with reference to FIGURE 3. The triangular areas 14 represents the magnetised portions of the rotor 1 and although in the figure the areas 14 have been defined, in practice they will not of course be visually apparent. In this example the areas of magnetisation define right angled triangles but it will become clear from the following description that a variety of other shapes will be acceptable provided they are asymmetric about the radii of the rotor 1 through their centres. The poles of the rotor are lettered alternately N and S to indicate north and south poles respectively and when no current is passed through the field coil the rotor will align itself in the position shown in FIGURE 3, i.e. in the position of minimum reluctance for the return flux through the stator pole pieces 5. If now a first pulse is applied to the field winding 7 in a sense such that stator poles A become north and stator poles B become south then the edges X of the rotor field will be repelled by the field of the stator and the edges Y of the rotor field will be attracted by the field of the stator thereby to cause the rotor to move through the distance of one pole in the direction indicated by the arrow. If a second pulse of opposite sense to the first pulse is applied to the stator the rotor will be caused to move one pole spacing in the direction of the arrow as before. The motor may thus be used as a step by step machine and when supplied with low frequency pulses will always start in one preferred direction which is determined by the asymmetrical shape of the magnetic rotor poles. In order to ensure that the motor will start in only one preferred direction at relatively high operational frequencies it is necessary to provide a ratchet or a spring device on the rotor shaft which permits rotation of the shaft in one direction only. Thus from the foregoing description it will be apparent that a motor having ten pairs of poles and having a 50 cycle per second voltage applied to the field winding, will run at a speed of 600 r.p.m.

Several alternative arrangements will be apparent which may be utilised without departing from the scope of the invention. For example the stator winding may comprise two half windings one of which may be energised to provide a basic field and the other half of which may be energised by pulses which produce a secondary field to cancel and override the basic field as the pulse is applied. The polarity of the stator field thus changes as the pulse is switched on and off thereby causing the rotor to step around. This arrangement may be modified by providing a permanent magnet in the stator to provide the basic field and a single field winding which when energised provides the secondary field which cancels and overrides the permanent magnet field. The cylinder 4 may be made in two similar halves insertable from opposite sides of the bobbin 6, each half having a number of similiar teeth defined by the castellated edge of a magnetic sheet metal annulus the teeth of each half being interdigitated within the bobbin 7 to define an even number of pole pieces. With this kind of construction the end plates 9 may be formed integral with respective halves.

The motor described may be operated as a pulse generator, the field winding being energised with D.C., and an output winding being associated with the stator for providing output pulses in response to rotation of the rotor.

What I claim is:
1. A rotary electric machine comprising a radially magnetised permanent magnet rotor which presents around its periphery an even number of alternate north and south magnetic poles which are asymmetrical with respect to the radii of the rotor through their centres, a stator coaxial with the rotor having interdigitated sator poles excited in operation by a winding coaxial with the rotor and arranged in such manner that in the absence of current the poles of the rotor are angularly offset with respect to at least half of the stator poles and that when the stator poles are energised either by means of alternating current or by unidirectional pulses of current a torque is exerted on the rotor.

2. A rotary electric machine as claimed in claim 1 wherein the interdigitated stator poles are in shape symmetrical about the radii of the rotor through their centres.

3. A rotary electric machine as claimed in claim 2 wherein the stator comprises an annular bobbin or former which carries the winding and within which the stator poles are housed.

4. A rotary electric machine as claimed in claim 3 wherein the stator poles are arranged around the inner surface of the annular bobbin to extend parallel with the longitudinal axis of the bobbin, the rotor being mounted for rotation within a sustantially cylindrical space defined by the inner surface of the bobbin and the stator poles.

5. A rotary electric machine as claimed in claim 4 wherein a rotor shaft to which the rotor is secured is mounted in bearings housed in magnetic end plates which fit one in each end of the annular bobbin thereby to specifically locate the rotor for rotation within the stator.

6. A rotary electric machine as claimed in claim 5 wherein an annular magnetic yoke is provided which fits snugly over the bobbin to complete the magnetic circuit of the machine through the end plates.

7. A rotary electric machine as claimed in claim 6 enclosed within a non-magnetic housing consisting of two parts at least one part being adapted to permit extension of a shaft therethrough when the machine is enclosed within the said housing.

8. A rotary electric machine as claimed in claim 7 wherein the winding comprises a single coil.

9. A rotary electric machine as claimed in claim 7 wherein an annular permanent magnet is provided coaxial with the stator and wherein the winding is energised, it produces a magnetic field of opposite polarisation to the field of the magnet which cancels and overrides the field of the permanent magnet.

10. A rotary electric machine as claimed in claim 7 wherein the stator poles are defined by a magnetic sheet metal open ended cylinder, press pierced to define around its periphery an even number of substantially rectangular pole pieces, evenly spaced and extending parallel to the longitudinal axis of the cylinder.

References Cited

UNITED STATES PATENTS

| | | | |
|---|---|---|---|
| 3,014,141 | 12/1961 | Riggs | 310—156 |
| 3,032,670 | 5/1962 | Fritz | 310—164 |
| 3,119,941 | 1/1964 | Guiot | 310—49 |
| 3,238,399 | 3/1966 | Croymans et al. | 310—46 |
| 3,355,645 | 11/1967 | Kawakami et al. | 318—138 |

WARREN E. RAY, Primary Examiner

U.S. Cl. X.R.

310—154, 156, 162, 181